United States Patent [19]
Arthurs

[11] Patent Number: 5,994,242
[45] Date of Patent: Nov. 30, 1999

[54] COATED WOVEN MATERIAL

[75] Inventor: Trevor Curtis Arthurs, Truro, Canada

[73] Assignee: Intertape Polymer Group, Canada

[21] Appl. No.: 08/950,159

[22] Filed: Oct. 14, 1997

Related U.S. Application Data

[63] Continuation-in-part of application No. 08/732,674, Oct. 18, 1996, abandoned
[60] Provisional application No. 60/005,716, Oct. 20, 1995.
[51] Int. Cl.$^6$ ..................................................... D06N 11/00
[52] U.S. Cl. ................................ 442/43; 442/59; 442/58; 442/102; 442/168; 442/170; 442/171
[58] Field of Search .................................. 442/59, 43, 46, 442/47, 58, 102, 103, 168, 170, 171

[56] References Cited

U.S. PATENT DOCUMENTS 4,239,831 12/1980 Pattenden .

*Primary Examiner*—William Krynski
*Assistant Examiner*—J. M. Gray
*Attorney, Agent, or Firm*—Fredrikson & Byron, PA

[57] ABSTRACT

A coated woven material comprising a layer of a woven scrim formed from a thermoplastic polymer in the form of at least one of fibres, filaments and tapes; and a coating on at least one side of said layer of an elastomeric polymer of ethylene and at least one hydrocarbon alpha-olefin comonomer of at least 4 carbon atoms. The elastomeric polymer has a glass transition temperature ($T_g$) of less than −20° C. and a brittleness temperature of less than −80° C. The material is particularly useful as a transportation cover.

16 Claims, No Drawings

COATED WOVEN MATERIAL

RELATED PATENT APPLICATION

This application is a continuation-in-part application of Ser. No. 08/732,674, filed Oct. 18, 1996, now abandoned, which in turn claims priority from U.S. Provisional Application No. 60/005,716, filed Oct. 20, 1995.

FIELD OF THE INVENTION

The present invention relates to a coated woven material, and especially to a coated woven material that exhibits light weight, cold temperature flexibility and abrasion resistance. In particular embodiments, the coated woven material is intended for use in the covering of goods being transported on a truck e.g. tarpaulins, although other uses are disclosed herein.

BACKGROUND TO THE INVENTION

Wrapping materials intended to cover goods on trucks, or the like, are well known. For many years, such wrapping materials particularly included tarpaulins. More recently, such tarpaulins have frequently been replaced with other materials, for instance polyester filament reinforced fabrics that have been coated with polyvinyl chloride (PVC). Other examples of wrapping materials used in the transportation of goods include lumber covers. Lumber covers tend to be specialized in their construction, being intended to wrap and protect stacks of lumber from the effects of weather during actual shipping and while the lumber sits in a yard prior to sale. A typical example of lumber wrap is made of a woven high density polyethylene fabric that is coated on one or preferably both sides with an extrusion coating of low density polyethylene containing a particulate mineral filler e.g. as disclosed in U.S. Pat. No. 4,239,831 of T. W. E. Pattenden.

Materials for the covering of goods on trucks are important for many reasons. For instance, rain and/or sun may have adverse effects on the goods, causing staining, water damage, bleaching, rusting or a variety of other adverse effects. In addition, in cold climates, sand and/or salt may be distributed on roads to overcome problems caused by snow and ice, both of which can cause significant damage to goods e.g. sand blasting-type effects accompanied by corrosion caused by the salt, resulting from the spray of slush, salt/sand mixtures or the like from vehicles passing along the road or highway. In other climates, spray from the ocean may similarly cause damage to goods on the vehicle. Coverings on trucks also discourage pilfering, vandalism or the like.

Examples of wrapping materials, especially coated woven materials, include woven high density polyethylene fabrics coated with low density polyethylene and woven polypropylene fabrics coated with polypropylene, in which the fabrics are usually formed of woven tapes. Woven coated materials of such construction generally do not have good low temperature flexibility properties. In cold climates, particularly during winter in Canada, Alaska, the northern regions of the United States of America and elsewhere in other areas of the Northern Hemisphere, temperatures are below 0° C. for several months of the year and may reach −40° C. or lower. Thus, an ability to withstand such temperatures without cracking, splitting or the like is important, and consequently low temperature flexibility properties can be particularly important for a number of climates. While PVC-coated polyester filament reinforced fabrics exhibit a number of useful properties, including an ability to be used at low temperature, such fabrics are capable of improvement, especially with respect to weight/unit area. Flexible PVC has a $T_g$ of about −20° C.

Truck tarpaulins have been made commercially from the type of fabric and coating described in the aforementioned patent of Pattenden. However, such tarpaulins fail prematurely from damage due to wind whip and cold temperature stiffness/cracking. An improvement in toughness of the low density polyethylene (LDPE) coating employed in such tarpaulins would be beneficial. Low density polyethylene is understood to have a brittleness temperature as measured by the procedure of ASTM D746 of about −80° C.

SUMMARY OF THE INVENTION

The present invention provides a wrapping material, specifically a coated woven material, having improved light weight, cold temperature flexibility and abrasion resistance.

Accordingly, an aspect of the present invention provides a coated woven material comprising:

(a) layer of a woven scrim formed from a thermoplastic polymer in the form of at least one of fibres, filaments and tapes; and (b) a coating on at least one side of said layer of woven scrim of a blend of 20–100% by weight of an elastomeric copolymer of ethylene and at least one hydrocarbon alpha-olefin comonomer of at least 4 carbon atoms, said elastomeric polymer having a glass transition temperature $(T_g)$ of less than −20° C. and a brittleness temperature as measured by the procedure of ASTM D746 of less than −100° C., and 0–80% by weight of a hydrocarbon polyolefin.

In a preferred embodiment of the present invention, the layer of woven scrim is formed from at least one of high density polyethylene tapes, polypropylene tapes, and polyester or polyamide fibres or filaments.

In another embodiment, the hydrocarbon polyolefin is polyethylene, especially low density polyethylene, or polypropylene.

In further embodiments of the invention, the coated woven material has a soft or fabric-like hand.

DETAILED DESCRIPTION OF THE INVENTION

The coated woven material is formed from a layer of woven scrim, with a coating on at least one side of the scrim. The scrim is formed from at least one of fibres, filaments and tapes, which are woven to form the scrim. The fibres, filaments and tapes are formed from a thermoplastic polymer, for instance polyethylene, polypropylene, polyester and polyamide. Particularly preferred examples include high density polyethylene, polypropylene, polyester especially polyethylene terephthalate, and polyamide, especially polyhexamethylene adipamide (nylon 66) or polycaprolactam (nylon 6) or related polymers. Combinations of fibres, filaments and tapes may be used, although such combinations are generally less preferred.

In particular examples of the scrim, the scrim is formed from high density polyethylene tapes or polypropylene tapes that are woven to form the scrim. The tapes of the warp or weft may be the same or different. The scrim provides the major proportion of the tensile strength properties of the coated woven material. Thus, it is preferred that the tapes be oriented tapes, especially oriented tapes of high density polyethylene or polypropylene. In embodiments, the tapes have a denier in the range of about 500 g to 4000 g, especially 850 to 2200 g. The width and count of the tapes are preferably such that the tapes provide 100% coverage i.e. there are no voids between tapes.

Alternatively, the scrim may be formed from fibres or filaments, especially polyethylene terephthalate or polyamide filaments.

Such scrims are known, and techniques for manufacture of such scrims are also known.

The coating is applied to at least one side of the layer of woven scrim. The coating is formed from an elastomeric copolymer of ethylene and at least one hydrocarbon alpha-olefin comonomer having at least 4 carbon atoms, it being understood that such comonomer is a mono-olefin. The elastomeric polymer has a glass transition temperature $T_g$ of less than $-20°$ C., especially less than $-40°$ C. and in particular less than $-60°$ C. brittleness temperature as measured by ASTM D746 of less than $-100°$ C. In embodiments, the elastomeric polymer has a density of less than 0.930 g/cm$^3$, especially less than 0.910 g/cm$^3$, density being measured by the procedure of ASTM D1505. An example of an elastomeric polymer is the elastomeric polymer available from Union Carbide Corp. under the trademark FLEXOMER™, and identified as DFDB 9042. It is understood that such a polymer is formed in a gas-phase fluidized bed process by copolymerizing ethylene with butene-1 and/or hexene-1.

The coating can be on one or on both sides of the layer of woven scrim. For most end-uses, it is preferred that the coating be on both sides of the scrim. An adhesive or tie layer may be used between the coating and the scrim, which would normally be applied by co-extruding the coating and tie layer.

The "hand" of a material relates to the feel of the material and particularly relates to the ability of a material to drape over an object. It is an expression that is especially used in the textile industry. It is preferred that the coated woven material of the invention not be stiff and paper-like but rather have a relatively soft or fabric-like hand so that, particularly in the form of a tarpaulin-like structure, it will substantially conform to the shape of a load on a truck.

While not wishing to be bound by any theory, it is believed that use of the elastomeric polymer imparts cold temperature resistance properties to the coated woven material as a result of the low $T_g$ viz. a $T_g$ of about $-100°$ C. in preferred embodiments. In particular, it is believed that the low $T_g$ of the elastomeric polymer assists in providing the coated woven material with flexibility that is acceptably retained even at cold temperatures experienced in the extremes of winter. Retention of flexibility at temperatures of less than 0° C. reduces susceptibility to brittle cracking, to consequent delamination of the coated woven material and to wind damage, especially "wind whip" damage. A measure of the retention of flexibility is provided by the aforementioned brittleness temperature, as measured by the procedure of ASTM D746. The elastomeric polymer used in the present invention has a brittleness temperature of less than $-100°$ C., whereas it is understood that an example of low density polyethylene has a brittleness temperature of $-80°$ C. Furthermore it is believed that use of the elastomeric polymer provides wind damage resistance as a result of an ability of the elastomeric polymeric coating to distribute stress within the coated woven material. Both of such properties are important in use of the coated woven material in a variety of end uses as described herein e.g. use as covers on loads on trucks, particularly at low temperatures experienced during winter in North America.

It is understood that antioxidants, UV stabilizers, pigments or the like may be added to the elastomeric polymer and/or the scrim. In addition, specific properties may be imparted to the elastomeric coating by addition of blending polymers, especially polyolefins. For instance, if improvement in high temperature resistance is required, an impact polypropylene could be blended into the elastomeric polymer, or if improvement in printability is required a blend of JEFFAMINE™ polymer and polypropylene could be blended with the elastomeric polymer. Other polymers may also be added.

In embodiments of the present invention, the coating is 20–100% by weight of the elastomeric copolymer and 0–80% by weight of a hydrocarbon polymer including polyethylene, especially low density polyethylene, polypropylene. In preferred embodiments, the coating is 25–50% by weight of the elastomeric copolymer and 50–75% by weight of hydrocarbon polymer, especially low density polyethylene. Use of blends of elastomeric copolymer and hydrocarbon polymer e.g. low density polyethylene, may improve properties of the coating. For example, such blends are less susceptible to effects of the extreme high ambient temperatures that may occur in some regions e.g. parts of the southern U.S. during summer months, especially seal strength properties.

Techniques for formation of the woven scrim utilized in the coated woven material of the present invention will be understood by persons skilled in the art. The coating of the elastomeric polymeric material may be applied by extrusion or by lamination. Extrusion coating of a layer of scrim may be accomplished by melting the coating in an extruder and extruding through a film die onto the woven scrim. The molten polymer and scrim are transported between a nip roll and a large chill roll to cool the molten elastomer.

The characteristics of a truck cover of acceptable properties include cold temperature flexibility, wear resistance, weather and wind damage resistance, light weight and resistance to UV radiation. It is believed that the coated woven materials of the present invention provide an improvement in the combination of these properties, compared to other commercially-available products. Moreover, the coated woven material of the present invention exhibits a reduction in weight of up to 40% in comparison to a similar product, in the same thickness, formed from woven polyester coated with PVC, while retaining acceptable and equivalent physical properties. Woven polyester coated with PVC typically weighs 14–24 oz/yd$^2$ (43.5–74.4 g/m$^2$).

The coated woven material of the present invention may be used in a wide variety of end uses. Use in covering of trucks, especially loads of trucks that are susceptible to effects of weather, has been discussed above. However, other uses may be made of the woven coated material including for instance flexible sign facing, banner fabrics, geomembranes, liquid containment systems, awnings and irrigation tubing. A wide variety of other uses will be apparent to persons skilled in the art, including uses currently employing PVC.

The present invention is illustrated by the following examples.

EXAMPLE I

A coated woven material was formed from a 16×16 scrim where the tapes were made from high density polyethylene (HDPE) having a denier of 1600 g. The scrim was coated on both sides with 2.5 mils of an elastomeric copolymer obtained from Union Carbide as FLEXOMER™ DFDB 9042. The coating was 100% by weight of the elastomeric copolymer. The resultant coated woven material had a weight of 10 oz/yd².

As a comparison, a coated woven material formed from a polyethylene terephthalate (PET) filament scrim that had been extrusion coated on both sides with a flexible polyvinyl chloride (PVC) was obtained. Such coated woven material was a commercially-available coated woven material. The coating was of different thicknesses on the two sides of the scrim. The resultant coated woven material had a weight of 18 oz/yd².

A series of tests were conducted on the two coated woven materials. Details of the tests and the results obtained are given in Table I.

TABLE I

| Property | Properties | | |
|---|---|---|---|
| | A* | B* | ASTM # |
| Thickness (mil) | 20 | 20 | |
| Weight (oz/yd²) | 10 | 18 | D2646-87 |
| Grab Strength (lbs) MD | 298 | 442 | D5034-90 |
| TD | 275 | 401 | |
| Trapezoidal Tear (lbs) MD | 60 | 100 | D4533-85 |
| TD | 70 | 62 | |
| Mullen Burst (psi) | 640 | 715 | D3786-87 |
| Taber Abrasion (cycles to expose scrim) (side 1/side 2) | 600/600 | 700/55 | D3884** |
| Taber Abrasion (g lost/500 cycles) | 0.03 | 0.11 | |

*A = Coated woven material formed from elastomeric polymer and HDPE
*B = Comparative coated woven material (PVC-coated PET scrim)
** Using H-18 500 g load The results show that the coated woven material formed from the elastomeric polymer had an equivalent thickness but a weight that was 40% less than the weight of the PVC-coated scrim. The elastomeric polymer coated material had similar physical properties to the PVC-coated material but significantly better abrasion resistance as measured by weight lost/cycle. It should be noted that the results for the PVC-coated material showed different results for the two sides of the coated material, because the thickness of the coating is different on the two sides.

A tarpaulin intended for use on the covering of goods on a transport truck that measured 24'×40' made from the above PVC-coated material would weigh approximately 120 lbs. In contrast a tarpaulin of the same size made from the elastomeric polymer coated woven material would weigh approximately 67 lbs. Such a reduction in weight of the tarpaulin of the same size is of substantial benefit to the driver of the transport, who must lift the tarpaulin to get the cover onto the load. Such a reduction in weight, while providing a cover of acceptable properties, is one of the significant advantages of the coated woven material of the present invention.

EXAMPLE II

Two samples of coated woven material were prepared using the 16×16 scrim of Example I i.e. using tapes made from high density polyethylene having a denier of 1600 g.

As a control, one of the scrims was coated with 2.75 mil of a blend of 94% by weight of low density polyethylene and 6% by weight of a carbon black masterbatch.

In an example of the present invention, the other scrim was coated on both sides with 2.75 mil of a blend of 64% by weight of the low density polyethylene, 30% by weight of the elastomeric copolymer in Example I and 6% by weight of the carbon black masterbatch.

The resultant coated woven material was tested for seam peel strength, hydroelastic resistance, and Taber resistance. The results obtained were as follows:

TABLE II

| TEST* | CONTROL | INVENTION |
|---|---|---|
| Seam Peel Strength (lbs) | 12 | 22 |
| Hydrostatic Resistance (psi) | 245 | >300 |
| Taber Abrasion (% wt less/1000 cycles) | 1.0 | 1.2 |

* Seam Peel strength measured by ASTM D413.
Hydrostatic Resistance measured by ASTM D751.
Taber Abrasion measured by ASTM D3884.

The coated woven material of the invention has approximately twice the seam peel strength of the control and significantly higher resistance to water penetration. Both of these properties are very important for tarpaulins, a primary intended use of the coated woven material. There was no significant deterioration in abrasion resistance.

I claim:
1. A coated woven material comprising:
   (a) layer of a woven scrim formed from a thermoplastic polymer in the form of at least one of fibres, filaments and tapes; and
   (b) a coating on at least one side of said layer of woven scrim of a blend of 20–100% by weight of an elastomeric copolymer of ethylene and at least one hydrocarbon alpha-olefin comonomer of at least 4 carbon atoms, said elastomeric polymer having a glass transition temperature ($T_g$) of less than $-20°$ C. and a brittleness temperature as measured by the procedure of ASTM D746 of less than $-100°$ C., and 0–80% by weight of a hydrocarbon polyolefin.
2. The coated woven material of claim 1 in which the layer of woven scrim is formed from at least one of high density polyethylene tapes, polypropylene tapes, polyester or polyamide fibres or filaments.
3. The coated woven material of claim 2 in which the layer of woven scrim is formed from at least one of high density polyethylene tapes and polypropylene tapes.
4. The coated woven material of claim 3 in which the coating is a blend of 25–50% by weight of elastomeric copolymer and 50–75% by weight of low density polyethylene.
5. A method of using the coated woven material of claim 4, comprising providing goods to be transported, covering the goods with said coated woven material and transporting the covered goods.
6. The coated woven material of claim 2 in which the layer of woven scrim is formed from at least one of polyester or polyamide fibres or filaments.
7. The coated woven material of claim 1 in the form of a cover for a vehicle for the transportation of goods.
8. The coated woven material of claim 1 that is characterized by a soft hand.
9. The coated woven material of claim 1 in which the density of the elastomeric copolymer is less than 0.930 g/cm³.
10. The coated woven material of claim 1 in which the density of the elastomeric polymer is less than 0.910 g/cm³.
11. The coated woven material of claim 10 in which the elastomeric polymer has a $T_g$ of less than $-40°$ C.

12. The coated woven material of claim 10 in which the elastomeric polymer has a $T_g$ of less than −60° C.

13. The coated woven material of claim 1 in which the elastomeric material is blended with a minor amount of at least one other polymer.

14. The coated woven material of claim 1 in which the coating is a blend of elastomeric copolymer and low density polyethylene.

15. The coated woven material of claim 14 in which the coating is a blend of 25–50% by weight of elastomeric copolymer and 50–75% by weight of hydrocarbon polymer.

16. A method of using the coated woven material of claim 1, comprising providing goods to be transported, covering the goods with said coated woven material and transporting the covered goods.

* * * * *